US012706042B2

(12) United States Patent

Park et al.

(10) Patent No.: US 12,706,042 B2

(45) Date of Patent: Aug. 11, 2026

(54) DISPLAY DEVICE AND DRIVING METHOD OF THE SAME

(71) Applicant: LG Display Co., Ltd., Seoul (KR)

(72) Inventors: Yong Kyu Park, Paju-si (KR); Jae Kook Ahn, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/972,426

(22) Filed: Dec. 6, 2024

(65) Prior Publication Data

US 2025/0218375 A1 Jul. 3, 2025

(30) Foreign Application Priority Data

Dec. 29, 2023 (KR) ........................ 10-2023-0197064

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2310/08* (2013.01); *G09G 2320/0233* (2013.01); *G09G 2320/045* (2013.01)

(58) Field of Classification Search
CPC ......... G09G 3/3233; G09G 2300/0819; G09G 2300/0842; G09G 2310/08; G09G 2320/0233; G09G 2320/045; G09G 3/20; G09G 3/32; G09G 3/3225
See application file for complete search history.

(56) References Cited

U.S. PATENT DOCUMENTS

| | | | | |
|---|---|---|---|---|
| 2014/0176400 | A1* | 6/2014 | Park | G09G 3/3233 345/76 |
| 2017/0004765 | A1* | 1/2017 | Tani | G09G 3/3275 |
| 2017/0061892 | A1* | 3/2017 | Jung | G09G 3/3291 |
| 2017/0162112 | A1* | 6/2017 | Ha | G09G 3/3266 |
| 2018/0061293 | A1* | 3/2018 | Park | G09G 3/3233 |
| 2018/0151129 | A1* | 5/2018 | Park | G09G 3/3233 |
| 2021/0407437 | A1* | 12/2021 | Jang | G09G 3/3233 |
| 2022/0036812 | A1* | 2/2022 | Noh | G09G 3/32 |
| 2022/0157215 | A1* | 5/2022 | Park | G09G 3/3266 |
| 2022/0199017 | A1* | 6/2022 | Kim | G09G 3/3258 |
| 2022/0199039 | A1* | 6/2022 | Lee | G09G 3/3266 |
| 2022/0199041 | A1* | 6/2022 | Park | G09G 3/3275 |
| 2022/0208082 | A1* | 6/2022 | Ban | G09G 3/3258 |
| 2022/0208116 | A1* | 6/2022 | Kim | G09G 3/3233 |
| 2023/0360575 | A1* | 11/2023 | Ban | G09G 3/20 |

* cited by examiner

*Primary Examiner* — Jeff Piziali
(74) *Attorney, Agent, or Firm* — Fenwick & West LLP

(57) ABSTRACT

A display device is disclosed. The display device includes a display module including a display panel configured to display an image, a driver configured to drive the display panel, and a timing controller configured to control the driver, and a power supply configured to supply power for driving of the display module. The display module operates in an order of driving preparation configured to operate a basic configuration required for an operation of a device, driving waiting compensation configured to sense at least one gate line for compensation of a driving waiting state of the display panel, and normal driving configured to display an image on the display panel.

10 Claims, 14 Drawing Sheets

DISPLAY DEVICE AND DRIVING METHOD OF THE SAME

CROSS-REFERENCE TO RELATED APPLICATION

This application claims the benefit of Republic of Korea Patent Application No. 10-2023-0197064, filed on Dec. 29, 2023, which is hereby incorporated by reference as set forth herein.

BACKGROUND

Field

The present disclosure relates to a display device and a driving method of the same.

Discussion of the Related Art

In accordance with advances in information technology, the market for a display device which is a connection medium between a user and information is expanding. Accordingly, use of a display device such as a light emitting display device (LED), a quantum dot display device (QDD), a liquid crystal display device (LCD), etc. is increasing.

The above-mentioned display devices include a display panel including sub-pixels, a driver configured to output a drive signal for driving of the display panel, a power supply configured to generate power to be supplied to the display panel or the driver, etc.

In such display devices, when a drive signal, for example, a scan signal and a data signal, etc., is supplied to the sub-pixels formed at the display panel, selected ones of the sub-pixels transmit light therethrough or directly emit light and, as such, an image may be displayed.

SUMMARY

Accordingly, the present disclosure is directed to a display device and a driving method of the same that substantially obviate one or more problems due to limitations and disadvantages of the related art.

An object of the present disclosure is to not only eliminate a problem of luminance variation (screen stains or line or block-shaped stains) caused by distortion of threshold voltage information possibly occurring when a display device is kept (or left) for a long time without being driven, but also to appropriately compensate for luminance variation in accordance with various environments and conditions, thereby enhancing compensation accuracy and compensation reliability.

Objects of the present disclosure are not limited to the above-described object, and other objects of the present disclosure not yet described will be more clearly understood by those skilled in the art from the following detailed description.

To achieve these objects and other advantages and in accordance with the purpose of the disclosure, as embodied and broadly described herein, a display device includes a display module including a display panel configured to display an image, a driver configured to drive the display panel, and a timing controller configured to control the driver, and a power supply configured to supply power for driving of the display module, wherein the display module operates in an order of driving preparation configured to operate a basic configuration required for an operation of a device, driving waiting compensation configured to sense at least one gate line for compensation of a driving waiting state of the display panel, and normal driving configured to display an image on the display panel.

The display module may perform the driving waiting compensation when a sensing flag defined in the timing controller is in an active state.

The display module may further perform driving preparation compensation between the driving waiting compensation and the normal driving, to sense all gate lines of the display panel.

The sensing flag may transition to an inactive state after execution of the driving waiting compensation.

The sensing flag may maintain the inactive state during execution of the normal driving.

The sensing flag may transition to an inactive state after execution of the driving waiting compensation and the driving preparation compensation.

The sensing flag may be generated again to have the active state when the display device deviates from a use waiting condition of the display panel.

The sensing flag may be generated again to have the active state when the display device deviates from an end compensation execution condition of the display panel.

In another embodiment of the present disclosure, a driving method of a display device including a display module including a display panel configured to display an image, a driver configured to drive the display panel, and a timing controller configured to control the driver, and a power supply configured to supply power for driving of the display module includes driving preparation configured to operate a basic configuration required for an operation of a device included in the display module, driving waiting compensation configured to sense at least on gate line for compensation of a driving waiting state of the display panel, and normal driving configured to display an image on the display panel.

The driving method may further performing driving preparation compensation between the driving waiting compensation and the normal driving, to sense all gate lines of the display panel.

The driving waiting compensation may be executed when a sensing flag defined in the timing controller is in an active state. The sensing flag may transition to an inactive state after execution of the driving waiting compensation.

The sensing flag may be generated again to have the active state when the display device deviates from a use waiting condition of the display panel or an end compensation execution condition of the display panel.

The present disclosure has an effect capable of eliminating a problem of luminance variation (screen stains or line or block-shaped stains) caused by distortion of threshold voltage information possibly occurring when the display device is kept (or left) for a long time without being driven. In addition, the present disclosure has an effect capable of enhancing compensation accuracy by performing compensation per pixel based on a threshold voltage compensation value newly updated along with driving of the light emitting display device even when the light emitting display device is kept (or left) for a long time without being driven. Furthermore, the present disclosure has an effect capable of enhancing compensation reliability of the light emitting display device by forcibly performing end compensation when a situation in which the light emitting display device is kept (or left) for a long time without being driven is repeated or when the end compensation is not appropriately executed.

BRIEF DESCRIPTION OF THE DRAWINGS

The accompanying drawings, which are included to provide a further understanding of the disclosure and are incorporated in and constitute a part of this application, illustrate embodiment(s) of the disclosure and along with the description serve to explain the principle of the disclosure. In the drawings.

DETAILED DESCRIPTION

A display device according to the present disclosure may be embodied as a television, an image player, a personal computer (PC), a home theater, a car electric device, a smartphone, etc., without being limited thereto. The display device according to the present disclosure may be embodied as a light emitting displayer display device (LED), a quantum dot display device (QDD), a liquid crystal display device (LCD), etc. For convenience of description, however, the following description will be given in conjunction with an example in which the display device according to the present disclosure is a light emitting display device configured to directly emit light based on an inorganic light emitting diode or an organic light emitting diode.

Figure 1:
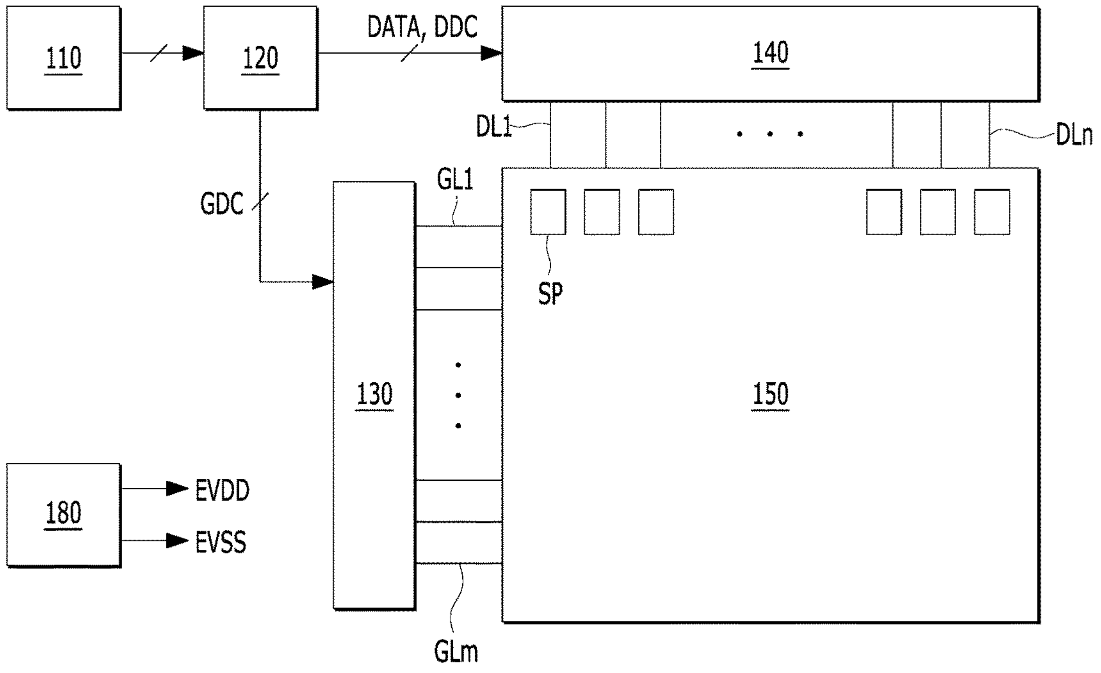
FIG. 1 is a block diagram schematically showing a light emitting display device according to one embodiment of the present disclosure.
Figure 2:
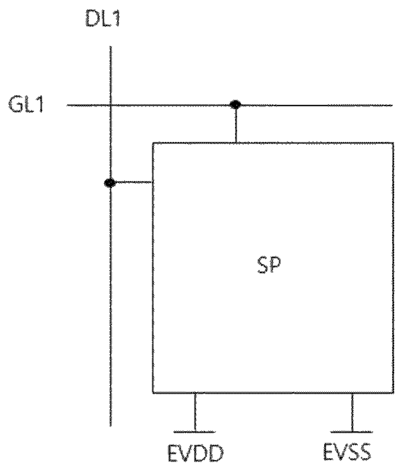
FIG. 2 is a configuration diagram schematically showing a sub-pixel shown in FIG. 1 according to one embodiment of the present disclosure.
Figure 3:
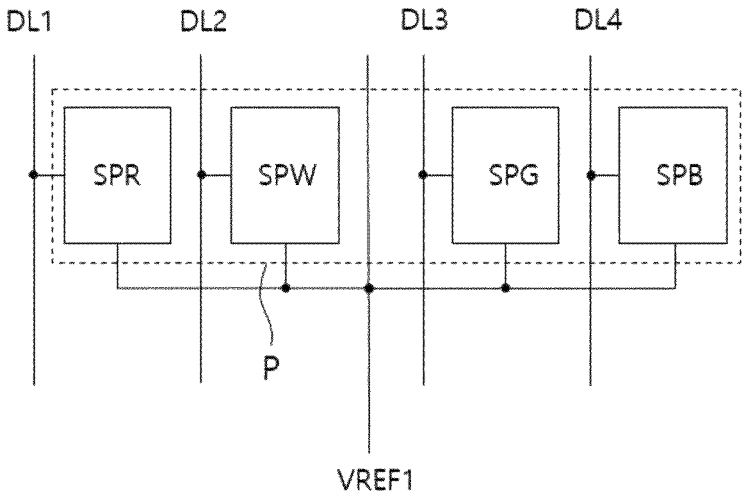
FIG. 3 is a diagram illustrating a pixel constituted by sub-pixels according to one embodiment of the present disclosure.

FIG. 1 is a block diagram schematically showing a light emitting display device according to one embodiment. FIG. 2 is a configuration diagram schematically showing a sub-pixel shown in FIG. 1 according to one embodiment. FIG. 3 is a diagram illustrating a pixel constituted by sub-pixels according to one embodiment.

As shown in FIGS. 1 to 3, the light emitting display device may include an image supplier 110, a timing controller 120, a scan driver 130, a data driver 140, a display panel 150, a power supply 180, etc.

The image supplier 110 (a set or a host system) may output various drive signals as well as an image data signal supplied from an exterior thereof or an image data signal stored in an internal memory. The image supplier 110 may supply the data signal and the various drive signals to the timing controller 120.

The timing controller 120 may output a gate timing control signal GDC for control of operation timing of the scan driver 130, a data timing control signal DDC for control of operation timing of the data driver 140, various synchronization signals, etc. The timing controller 120 may supply, to the data driver 140, a data signal DATA supplied from the image supplier 110, together with the data timing control signal DDC. The timing controller 120 may take the form of an integrated circuit (IC) and, as such, may be mounted on a printed circuit board, without being limited thereto.

The scan driver 130 may output a scan signal (or a scan voltage) in response to the gate timing control signal GDC, etc. supplied from the timing controller 120. The scan driver 130 may supply a scan signal to sub-pixels included in the display panel 150 via gate lines GL1 to GLm. The scan driver 130 may take the form of an IC or may be directly formed on the display panel 150 in the form of a gate-in-panel structure, without being limited thereto.

The data driver 140 may sample and latch the data signal DATA in response to the data timing control signal DDC, etc. supplied from the timing controller 120, may convert a data signal having a digital form into a data voltage having an analog form, and may then output the resultant data voltage. The data driver 140 may supply the data voltage to the sub-pixels included in the display panel 150 via data lines DL1 to DLn. The data driver 140 may take the form of an IC and, as such, may be mounted on the display panel 150 or a printed circuit board, without being limited thereto.

The power supply 180 may generate first power of a high level and second power of a low level based on an external input voltage supplied from an exterior thereof, may output the first power through a first power line EVDD, and may output the second power through a second power line EVSS. The power supply 180 may generate and output not only the first power and the second power, but also a voltage required for driving of the scan driver 130 (for example, a scan high voltage and a scan low voltage) or a voltage required for driving of the data driver 140 (a drain voltage and a half-drain voltage).

The display panel 150 may display an image, corresponding to the drive signal including the scan signal and the data voltage, the first power, the second power, etc. The sub-pixels of the display panel 150 may directly emit light. The display panel 150 may be manufactured based on a substrate having stiffness or ductility, such as glass, silicon, polyimide, or the like. For example, one sub-pixel SP may include a pixel circuit connected to the first data line DL1, the first gate line GL1, the first power line EVDD, and the second power line EVSS while being constituted by a switching transistor, a driving transistor, a capacitor, an organic light emitting diode, etc.

The sub-pixel SP used in the light emitting display device directly emits light and, as such, the circuit configuration thereof is complex. In addition, a compensation circuit configured to compensate for degradation of not only the organic light emitting diode configured to emit light, but also the driving transistor configured to supply drive current required for driving of the organic light emitting diode, etc. is also diverse. Accordingly, it is noted that, in FIG. 2, the sub-pixel SP is simply shown in the form of a block.

The sub-pixels may emit red, green, or blue light, or may emit red, green, blue or white light. Accordingly, one pixel P may include red, green and blue sub-pixels or may include red, green, blue, and white sub-pixels. For example, one pixel P may include a red sub-pixel SPR connected to the first data line DL1, a white sub-pixel SPW connected to the second data line DL2, a green sub-pixel SPG connected to the third data line DL3, and a blue sub-pixel SPB connected to the fourth data line DL4. In addition, the red sub-pixel SPR, the white sub-pixel SPW, the green sub-pixel SPG, and the blue sub-pixel SPB may be connected to a first reference line VREF1 in common. The first reference line VREF1 may be used to sense degradation, etc. of an element (elements) included in one of the red sub-pixel SPR, the white sub-pixel SPW, the green sub-pixel SPG, and the blue sub-pixel SPB. This will be described later.

Meanwhile, heretofore, the timing controller 120, the scan driver 130, the data driver 140, etc. have been described as individual configurations, respectively. However, one or more of the timing controller 120, the scan driver 130, and the data driver 140 may be integrated in one IC in accordance with an implementation method of the light emitting display device. The timing controller 120, the scan driver 130, the data driver 140, and the display panel 150 may be defined as a display module.

In addition, an example of the pixel P in which the red sub-pixel SPR, the white sub-pixel SPW, the green sub-pixel SPG, and the blue sub-pixel SPB are disposed in this order has been illustrated. However, the disposition order and direction of sub-pixels may be varied in accordance with an implementation method of the light emitting display device.

Figure 4:
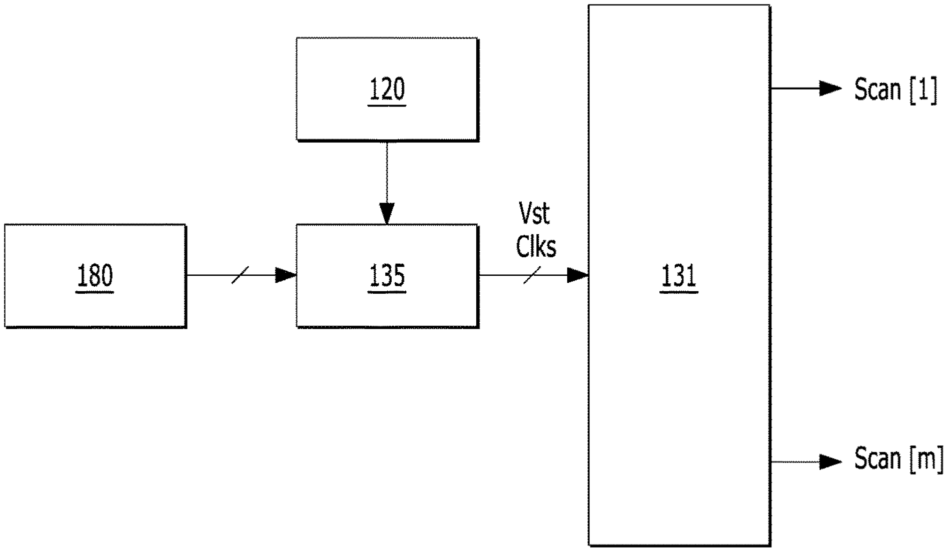
FIGS. 4 and 5 are diagrams explaining a configuration of a gate-in-panel type scan driver according to one embodiment of the present disclosure.
Figure 5:
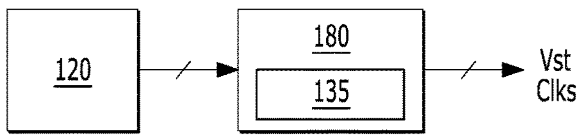
Figure 6:
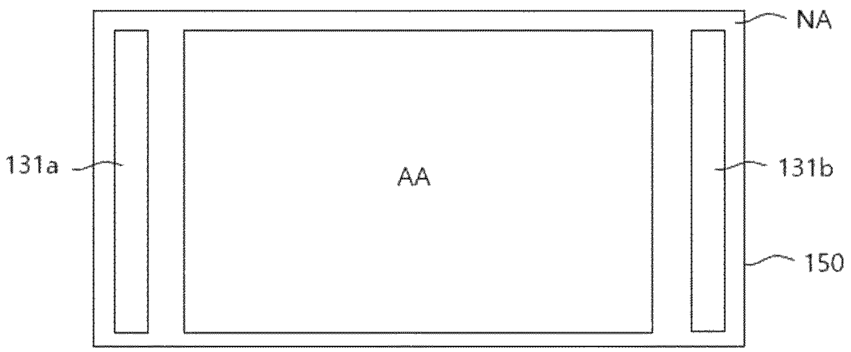
FIG. 6 is a diagram showing a disposition example of the gate-in-panel type scan driver according to one embodiment of the present disclosure.

FIGS. 4 and 5 are diagrams explaining a configuration of a gate-in-panel type scan driver according to one embodiment. FIG. 6 is a diagram showing a disposition example of the gate-in-panel type scan driver according to one embodiment.

As shown in FIG. 4, the gate-in-panel type scan driver may include a shift register 131 and a level shifter 135. The level shifter 135 may generate driving clock signals Clks and a start signal Vst based on signals and voltages output from a timing controller 120 and a power supply 180.

The shift register 131 may operate based on the signals Clks and Vst, etc. output from the level shifter 135, and may output scan signals Scan[1] to Scan[m] for turning on or off transistors formed at a display panel. The shift register 131 may be formed on the display panel in the form of a thin film in accordance with a gate-in-panel method.

As shown in FIGS. 4 and 5, the level shifter 135 may be independently formed in the form of an IC, differently from the shift register 131, or may be included in a power supply 180. Of course, these configurations are only illustrative, and the present disclosure is not limited thereto.

As shown in FIG. 6, in the gate-in-panel type scan driver, shift registers 131*a* and 131*b*, which output scan signals, may be disposed in a non-active area NA of a display panel 150. Although FIG. 6 shows an example in which the shift registers 131*a* and 131*b* are disposed in left and right non-active areas NA of the display panel 150, respectively, the shift registers 131*a* and 131*b* may be disposed in upper and lower non-active areas NA of the display panel 150, respectively, or may be disposed in an active area AA of the display panel 150.

Figure 7:
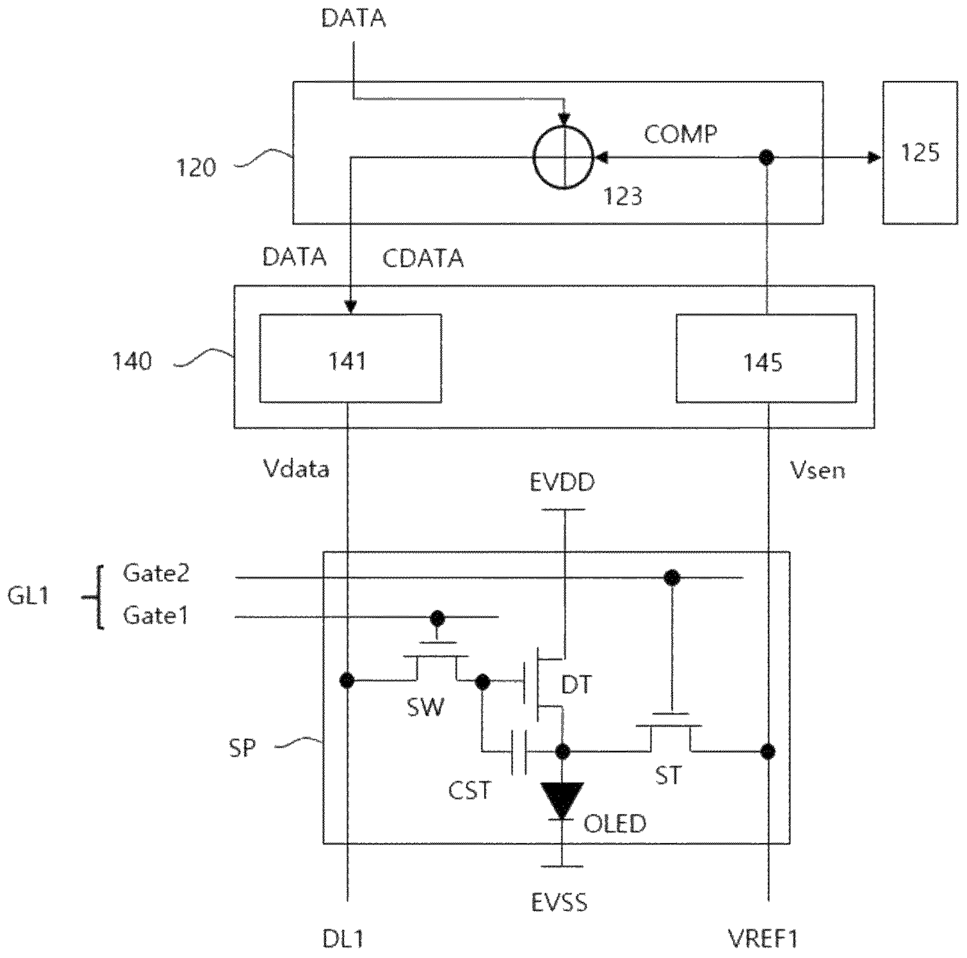
FIG. 7 is a diagram illustrating a sub-pixel, a data driver, and a timing controller according to an embodiment.
Figure 8:
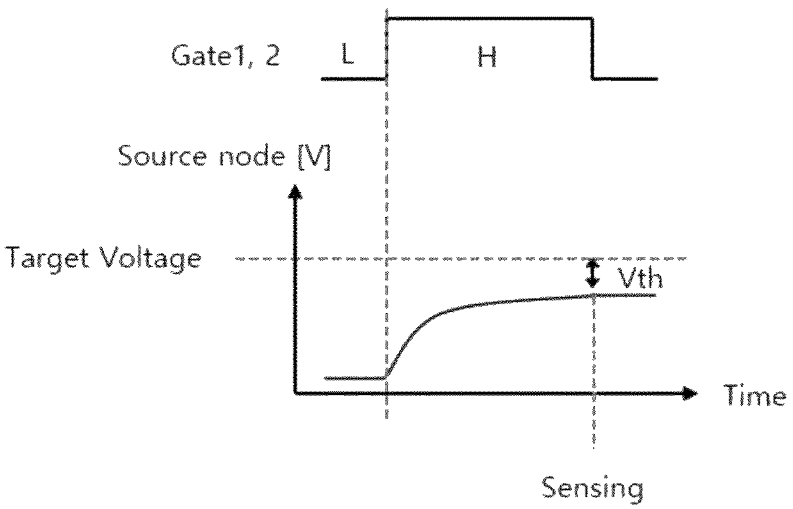
FIG. 8 is a diagram explaining a method of sensing a threshold voltage of a driving transistor in accordance with an embodiment.

FIG. 7 is a diagram illustrating a sub-pixel, a data driver, and a timing controller according to an embodiment. FIG. 8 is a diagram explaining a method of sensing a threshold voltage of a driving transistor in accordance with an embodiment.

As shown in FIG. 7, one sub-pixel SP may include a switching transistor SW, a driving transistor DT, a sensing transistor ST, a capacitor CST, and an organic light emitting diode OLED.

The driving transistor DT may be connected to a first electrode of the capacitor CST at a gate electrode thereof while being connected to a first power line EVDD at a first electrode thereof and connected to an anode of the organic light emitting diode OLED at a second electrode thereof. The capacitor CST may be connected to the gate electrode of the driving transistor DT at the first electrode thereof while being connected to the anode of the organic light emitting diode OLED at a second electrode thereof. The organic light emitting diode OLED may be connected to the second electrode of the driving transistor DT at the anode thereof while being connected to a second power line EVSS at a cathode thereof.

The switching transistor SW may be connected to a first scan line Gate1 included in a first gate line GL1 at a gate electrode thereof while being connected to a first data line DL1 at a first electrode thereof and connected to the gate electrode of the driving transistor DT at a second electrode thereof. The sensing transistor ST may be connected to a second scan line Gate2 included in the first gate line GL1 at a gate electrode thereof while being connected to a first reference line VREF1 at a first electrode thereof and connected to the anode of the organic light emitting diode OLED at a second electrode thereof.

The switching transistor SW may function to transmit, to the capacitor CST, a data voltage Vdata transmitted through the first data line DL1. The sensing transistor ST may function to sense a sensing node defined between the driving transistor DT and the organic light emitting diode OLED. The sensing transistor ST is a kind of compensation circuit added to compensate for degradation (threshold voltage, mobility, etc.) of the driving transistor DT or the organic light emitting diode OLED. Meanwhile, the first gate line GL1 may have an integrated structure without being divided into the first scan line Gate1 and the second scan line Gate2.

That is, the switching transistor SW and the sensing transistor ST may be connected to the first gate line GL1 in common and, as such, may be simultaneously turned on or off.

The data driver, which is designated by reference numeral "140", may include a driving circuit part 141 configured to drive the sub-pixel SP, and a sensing circuit part 145 configured to sense an element included in the sub-pixel SP. The driving circuit part 141 may output the data voltage Vdata, etc. for driving of the sub-pixel SP through the first data line DL1. The sensing circuit part 145 may obtain a sensing voltage Vsen sensed from the sub-pixel SP through the first reference line VREF1.

The timing controller, which is designated by reference numeral "120", may include a compensator 123, etc. configured to compensate a data signal DATA to be supplied to the sub-pixel SP, based on the sensing voltage Vsen transmitted from the sensing circuit part 145, thereby supplying a compensated data signal CDATA. For example, the compensator 123 may obtain threshold voltage information (variation values) of driving transistors DT respectively included in sub-pixels SP (in the entirety of a display panel), and may compensate data signals DATA in order to eliminate a problem caused by threshold voltage variation (shift). The compensator 123 may update threshold voltage information of the driving transistors DT stored in a memory 125 on a sub-pixel basis, based on sensing voltages Vsen, respectively, and may provide compensation values COMP for compensation of respective data signals DATA, based on the updated threshold voltage information.

As shown in FIGS. 7 and 8, when scan signals respectively applied to the first scan line Gate1 and the second scan line Gate2 transition from a low voltage (L) to a high voltage (H), a basic operation condition required for sensing may be established.

The sensing transistor ST may enable physical sensing of a threshold voltage Vth based on a source follower operation of the driving transistor DT. A source node voltage (Source node [V]) of the driving transistor DT may rise along a predetermined curve with passage of time.

However, the source node voltage (Source node [V]) of the driving transistor DT may rise up to the threshold voltage Vth of the driving transistor DT before reaching a target voltage. The sensing transistor ST may sense a time when the source node voltage (Source node [V]) of the driving transistor DT rises up to the threshold voltage Vth of the driving transistor DT. Consequently, the sensing transistor ST senses the threshold voltage Vth of the driving transistor DT through the sensing voltage Vsen.

FIG. 8 is an illustrative diagram supporting understanding of a voltage sensing method configured to obtain a voltage, among methods of sensing the threshold voltage Vth of the driving transistor DT using the sensing transistor ST. The method of sensing an element included in the sub-pixel SP using the sensing transistor ST, etc. may be performed based on various methods, for example, a current sensing method configured to obtain current, and various circuits. Accordingly, the sensing method usable in the present disclosure is not limited to the circuit of FIG. 7 and the waveform of FIG. 8.

Meanwhile, in accordance with experimental results, it was seen that a display panel included in a light emitting display device may not only exhibit variation of characteristics caused by degradation when the light emitting display device is driven for a long time, but also may exhibit variation of characteristics even when the light emitting display device is kept (or left) for a long time without being driven. Here, conditions that the display panel is kept for a long time without being driven may be varied in accordance with a storage period (or a transportation period) or a storage environment (temperature, humidity, etc.).

To this end, the present disclosure proposes a scheme for eliminating/reducing problems possibly occurring due to various causes when the light emitting display device is kept (or left) without being driven for a long time.

Figure 9:
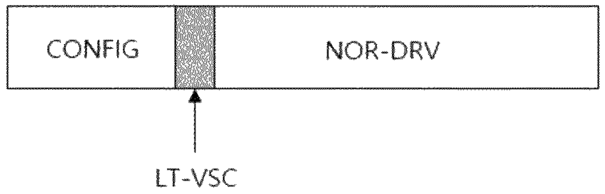
FIG. 9 is a concept diagram explaining a driving waiting compensation method according to a first embodiment.
Figure 10:
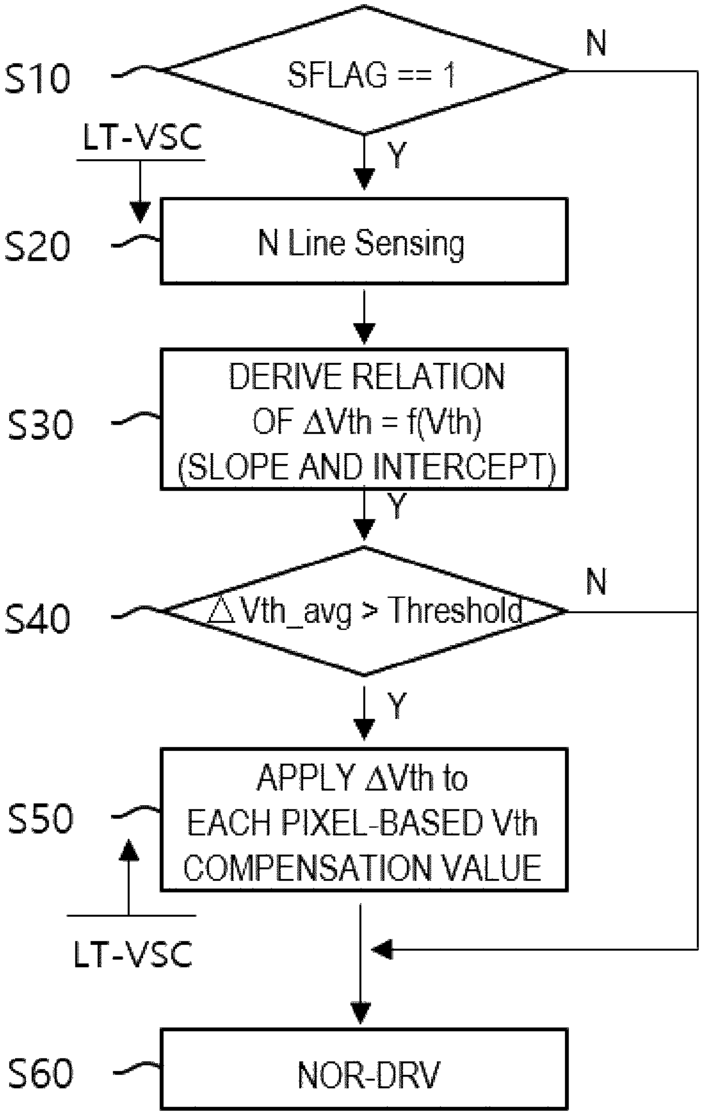
FIG. 10 is a flowchart explaining the driving waiting compensation method according to the first embodiment.
Figure 11:
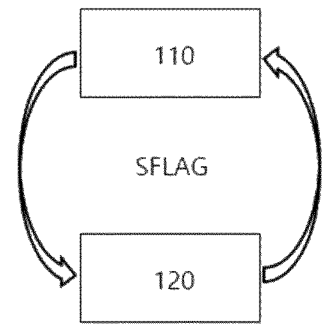
FIG. 11 is a block diagram explaining generation of a sensing flag for driving waiting compensation according to the first embodiment.
Figure 12:
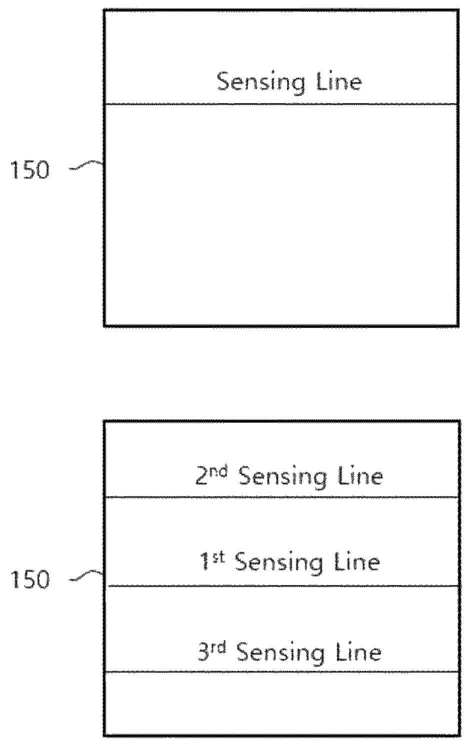
FIG. 12 is an illustrative diagram explaining a sensing line for the driving waiting compensation according to the first embodiment.

FIG. 9 is a concept diagram explaining a driving waiting compensation method according to a first embodiment. FIG. 10 is a flowchart explaining the driving waiting compensation method according to the first embodiment. FIG. 11 is a block diagram explaining generation of a sensing flag for the driving waiting compensation according to the first embodiment. FIG. 12 is an illustrative diagram explaining a sensing line for the driving waiting compensation according to the first embodiment.

As shown in FIG. 9, a light emitting display device according to the first embodiment may operate in an order of driving preparation CONFIG, driving waiting compensation LT-VSC, and normal driving NOR-DRV.

The driving preparation CONFIG is a step of operating a basic configuration (the timing controller of FIG. 1, etc.) required for operation of the light emitting display device after application of power (AC power and DC power). The driving waiting compensation LT-VSC is a step of sensing sub-pixels disposed at the display panel, thereby compensating a driving waiting state in accordance with conditions internally set in the light emitting display device, for example, whether or not the light emitting display device has been kept (or left) for a long time without being driven. The normal driving NOR-DRV is a step of displaying an image on the display panel while driving the light emitting display device under normal conditions (or general conditions).

Meanwhile, the driving waiting compensation LT-VSC may be executed in a state in which the display panel displays black on a screen thereof, without being limited thereto. For example, the driving waiting compensation LT-VSC may be executed while displaying text such as "driving waiting compensating" or "driving preparing" on the screen of the display panel. Of course, an area in which text is displayed may be excluded from lines of the display panel to be sensed.

As shown in FIGS. 9 to 12, the light emitting display device may determine whether or not the state of a sensing flag SFLAG is high (1) (an active state) (SFLAG==1) (S10). For example, the sensing flag SFLAG may be generated in an image supplier (set or host system) 110 or may be generated in a timing controller 120. The image supplier 110 and the timing controller 120 may share the state of the sensing flag SFLAG, for efficient device control and compensation. In addition, if necessary, the sensing flag SFLAG may be generated in the image supplier 110 at the request of the timing controller 120 or may be generated in the timing controller 120 at the request of the image supplier 110.

When the state of the sensing flag SFLAG is not a state of high (1) (a state of low (0) or an inactive state) (N), the normal driving NOR-DRV may be executed without execution of the driving waiting compensation LT-VSC (S60). On the other hand, when the state of the sensing flag SFLAG is high (1) (Y), the driving waiting compensation LT-VSC may be executed. Hereinafter, this will be described.

When the driving waiting compensation LT-VSC starts, the light emitting display device may sense N gate lines (N being an integer of 1 or greater) from the display panel (S20). In a first example, the light emitting display device may define one gate line disposed at a particular position of the display panel 150 as a sensing line, as shown in an upper part of FIG. 12, and may then sense the gate line. In a second example, the light emitting display device may define three gate lines disposed at a particular position of the display panel 150 as sensing lines (first, second, and third sensing lines), as shown in a lower part of FIG. 12, and may then sequentially sense these gate lines.

Sensing one gate line may mean sensing sub-pixels included in the display panel 150 in accordance with different colors. For example, when the display panel 150 is implemented based on pixels P each including a red sub-pixel SPR, a white sub-pixel SPW, a green sub-pixel SPG, and a blue sub-pixel SPB, as shown in FIG. 3, color-based sensing voltages may be obtained from the sub-pixels, respectively.

The number of sensing lines settable in the driving waiting compensation LT-VSC may be defined to be a minimum of 1 to a maximum of 8 (that is, N=1 to 8). This is because, although there is an advantage in terms of accuracy enhancement when the number of sensing lines increases, consumption of time in this case should be taken into consideration. Of course, this is only illustrative, and the present disclosure is not limited to the above-described conditions.

Thereafter, a threshold voltage variation value ΔVth may be calculated based on the sensing voltages obtained through sensing for the sub-pixels connected to the N gate lines, and a relation f(Vth) between the threshold voltage variation value ΔVth and an initial threshold voltage (ΔVth=f(Vth)) may be derived (S30). Here, the relation f(Vth) between the threshold voltage variation value ΔVth and the initial threshold voltage may be derived based on a linear function including a slope and an intercept. This will be described later.

Next, whether or not an average threshold voltage variation value ΔVth_avg deviates from a reference threshold voltage value Threshold internally set may be determined (ΔVth_avg>Threshold) (S40). Meanwhile, when the average threshold voltage variation value ΔVth_avg is used in place of the threshold voltage variation value ΔVth, it may be possible to minimize or remove sensing noise possibly generated during sensing. However, this is only one illustrative method for minimizing or removing sensing noise, and whether or not the threshold voltage variation value ΔVth deviates from the internally-set reference threshold voltage value Threshold may be determined.

Thereafter, when the average threshold voltage variation value ΔVth_avg does not deviate from the reference threshold voltage value Threshold (N), the normal driving NOR-DRV may be executed without execution of a subsequent step S50 (S60). On the other hand, when the average threshold voltage variation value ΔVth_avg deviates from the reference threshold voltage value Threshold (Y), a step of applying the threshold voltage variation value ΔVth to each pixel-based threshold voltage compensation value may be executed (S50).

Thereafter, the normal driving NOR-DRV may be executed because the driving waiting compensation LT-VSC is completed through execution of the step of applying the threshold voltage variation value ΔVth to each pixel-based threshold voltage compensation value (S60). Although the sensing flag SFLAG may be maintained in a low state (a state of 0 or an inactive state) during the normal driving NOR-DRV, the sensing flag SFLAG may again become an active state when the sensing flag SFLAG does not satisfy the internally-set conditions. This will be described hereinafter.

Figure 13:
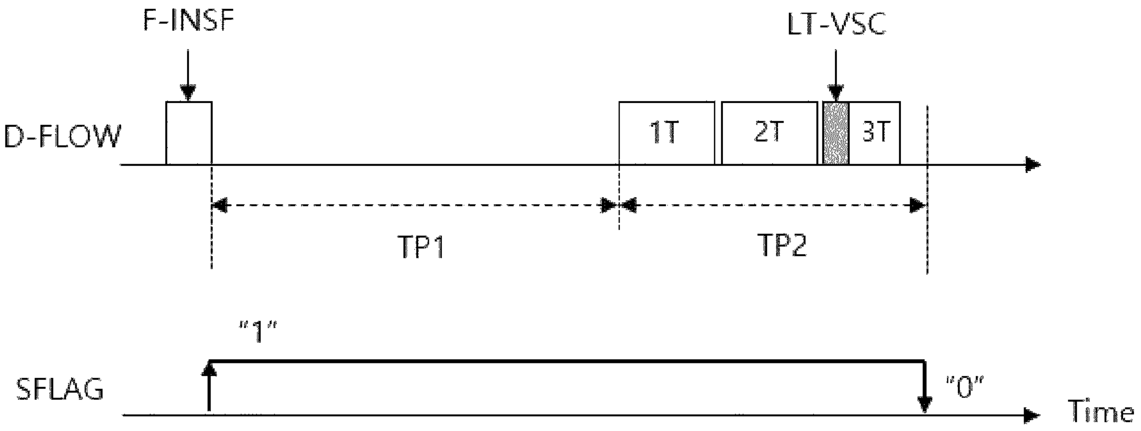
FIG. 13 is a concept diagram explaining whether or not the driving waiting compensation according to the first embodiment has been executed and variation of the sensing flag.
Figure 14:
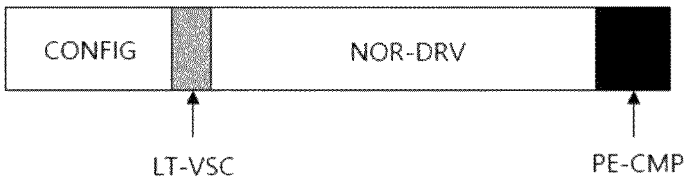
FIG. 14 is a concept diagram explaining a modification of the first embodiment.

FIG. 13 is a concept diagram explaining whether or not the driving waiting compensation according to the first embodiment has been executed and variation of the sensing flag. FIG. 14 is a concept diagram explaining a modification of the first embodiment.

As can be seen from an operation flow D-FLOW shown in FIG. 13, the sensing flag SFLAG may be maintained for a first period TP1 and a second period TP2 as the manufacturer sets a basic state of the sensing flag SFLAG to high (1) after performing final inspection F-INSF for the light emitting display device.

The first period TP1 may be defined as a delivery waiting period or a transportation period of the light emitting display device for which the final inspection F-INSF has been completed. Typically, the first period TP1 may be a relatively long period that may be defined in units of days, for example, may be about 10 to 100 days.

The second period TP2 may be defined as a receipt inspection period taken by a company receiving the delivered light emitting display device. Receipt inspection may be varied in accordance with different companies receiving the light emitting display device and, as such, no description thereof will be given.

FIG. 13 is an illustrative diagram showing that the light emitting display device was turned on/off in a first time 1T, a second time 2T, and a third time 3T in the second period TP2, and the driving waiting compensation LT-VSC was executed in the third time 3T. Execution of the driving waiting compensation LT-VSC in the third time 3T means that the driving waiting compensation LT-VSC was not normally executed in the first time 1T and the second time 2T because the light emitting display device was forcibly turned off in the first time 1T and the second time 2T. Here, "forcibly turned off" may not correspond to the case in which the light emitting display device is turned off using a remote controller, but may correspond to the case in which a power plug of the light emitting display device is unplugged from a power socket.

Meanwhile, as described above, the driving waiting compensation LT-VSC may have conditions enabling execution thereof when the state of the sensing flag SFLAG maintains high (1). Accordingly, the sensing flag SFLAG may transition to low (0) only when end compensation, which will be described later with reference to FIG. 14, is executed, even if the display panel is turned on/off multiple times in the second period TP2. Description associated with the end compensation may refer to the following description.

As shown in FIG. 14, in accordance with the modification of the first embodiment, the light emitting display device may operate in an order of driving preparation CONFIG, driving waiting compensation LT-VSC, normal driving NOR-DRV, and end compensation PE-CMP.

In the case in which the execution time of the normal driving NOR-DRV is long (that is, the case in which an image is displayed for a long time), the sub-pixels included in the display panel may be degraded with passage of time. As described above, the display panel included in the light emitting display device may not only exhibit variation of characteristics caused by degradation when the light emitting display device is driven for a long time, but also may exhibit variation of characteristics even when the light emitting display device is kept (or left) for a long time without being driven.

Even though the driving waiting compensation LT-VSC has been executed taking into consideration the above-described characteristics, the modification of the first embodiment may perform the end compensation PE-CMP in order to compensate for variation of characteristics caused by degradation when the normal driving NOR-DRV has been executed for a long time.

The end compensation PE-CMP may take the same sensing method as that of the driving waiting compensation LT-VSC. However, the end compensation PE-CMP may be different from the driving waiting compensation LT-VSC because the end compensation PE-CMP is included in substantial degradation compensation. For example, the light emitting display device may sense all gate lines of the display panel, thereby obtaining color-based sensing voltages, and may change and update respective pixel-based threshold voltage compensation values, etc., based on the color-based sensing voltages.

When the end compensation PE-CMP is executed after execution of the normal driving NOR-DRV for a long time, as described above, an additional variation value may be concretely reflected on the threshold variation value ΔVth reflected on each pixel-based threshold voltage compensation value in the driving waiting compensation LT-VST and, as such, each pixel-based threshold voltage compensation value may be updated again. That is, the threshold voltage compensation value, on which degradation states up to a final degradation state before driving ending of the display panel have been reflected, may be provided and, as such, compensation accuracy when the display panel is driven again may be enhanced.

As apparent from the above description, the first embodiment may eliminate a problem of luminance variation (screen stains or line or block-shaped stains) caused by distortion of threshold voltage information possibly occurring when the light emitting display device is kept (or left) for a long time without being driven.

Figure 15:
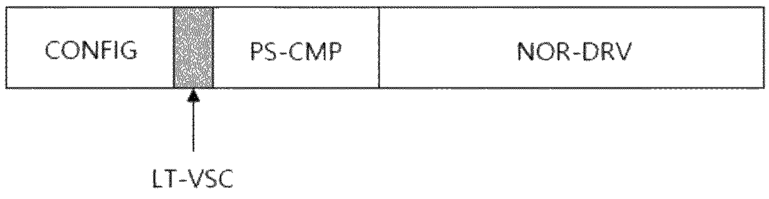
FIG. 15 is a concept diagram explaining a driving waiting compensation method according to a second embodiment.
Figure 16:
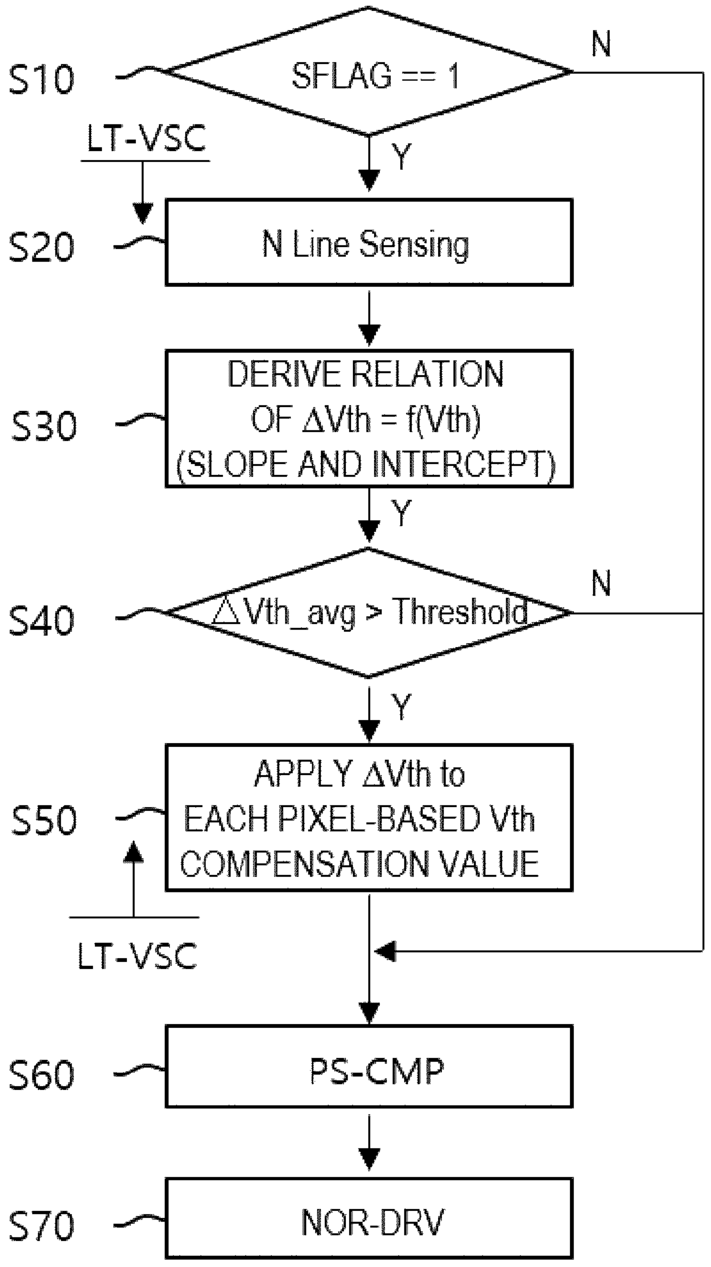
FIG. 16 is a flowchart explaining the driving waiting compensation method according to the second embodiment.

FIG. 15 is a concept diagram explaining a driving waiting compensation method according to a second embodiment. FIG. 16 is a flowchart explaining the driving waiting compensation method according to the second embodiment.

As shown in FIGS. 15 and 16, a light emitting display device according to the second embodiment may operate in an order of driving preparation CONFIG, driving waiting compensation LT-VSC, start compensation PS-CMP, and normal driving NOR-DRV.

In accordance with the second embodiment, when the state of a sensing flag SFLAG is not high (1) (low or 0) (N), the start compensation PS-CMP may be executed without execution of the driving waiting compensation LT-VSC (S60), and the normal driving NOR-DRV may then be executed (S70). In addition, when an average threshold voltage variation value ΔVth_avg does not deviate from a reference threshold voltage value Threshold (N), even if the driving waiting compensation LT-VSC is being executed, the start compensation PS-CMP may be executed (S60), and the normal driving NOR-DRV may then be executed (S70). Remaining steps are similar to those of the first embodiment and, as such, may refer to the description given in conjunction with the first embodiment.

The start compensation PS-CMP may employ the same sensing method as that of the end compensation PE-CMP. When the start compensation PS-CMP is executed after the driving waiting compensation LT-VSC is executed, compensation per pixel may be performed based on a threshold voltage compensation value newly updated along with driving of the display panel, even when the light emitting display device is kept (or left) for a long time without being driven.

The start compensation PS-CMP and the end compensation PE-CMP correspond to a step of sensing all gate lines of the display panel before the display panel displays an image through driving thereof (immediately after turning-on of the display panel) or after the display panel displays an image (immediately before turning-off of the display panel) and performing compensation on a pixel basis based on threshold voltage compensation values when the display module is turned on/off and, as such, may be included in driving preparation compensation.

As apparent from the above description, the second embodiment may enhance compensation accuracy by performing compensation on a pixel basis based on a threshold voltage compensation value newly updated along with driving of the light emitting display device even when the light emitting display device is kept (or left) for a long time without being driven.

Figure 17:
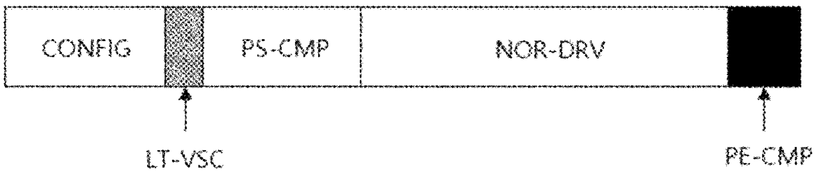
FIG. 17 is a concept diagram explaining a driving waiting compensation method according to a third embodiment.
Figure 18:
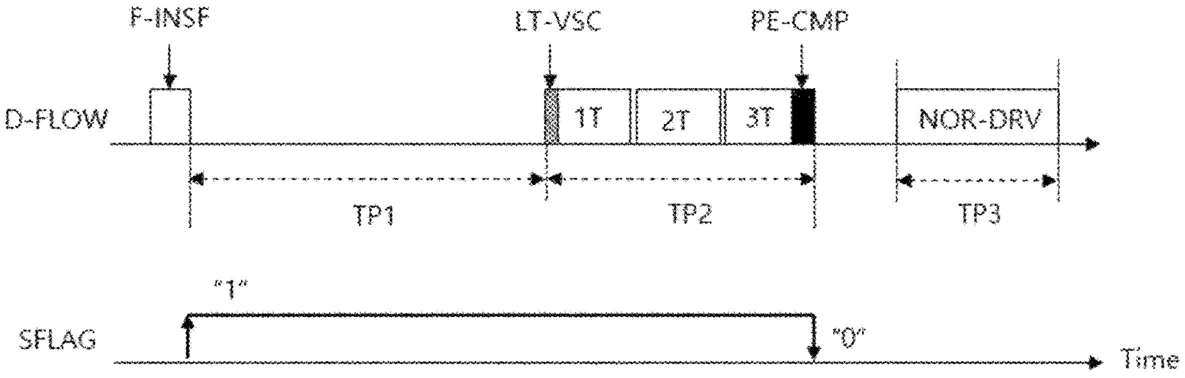
FIG. 18 is a concept diagram explaining whether or not driving waiting compensation according to the third embodiment has been executed and variation of a sensing flag.
Figure 19:
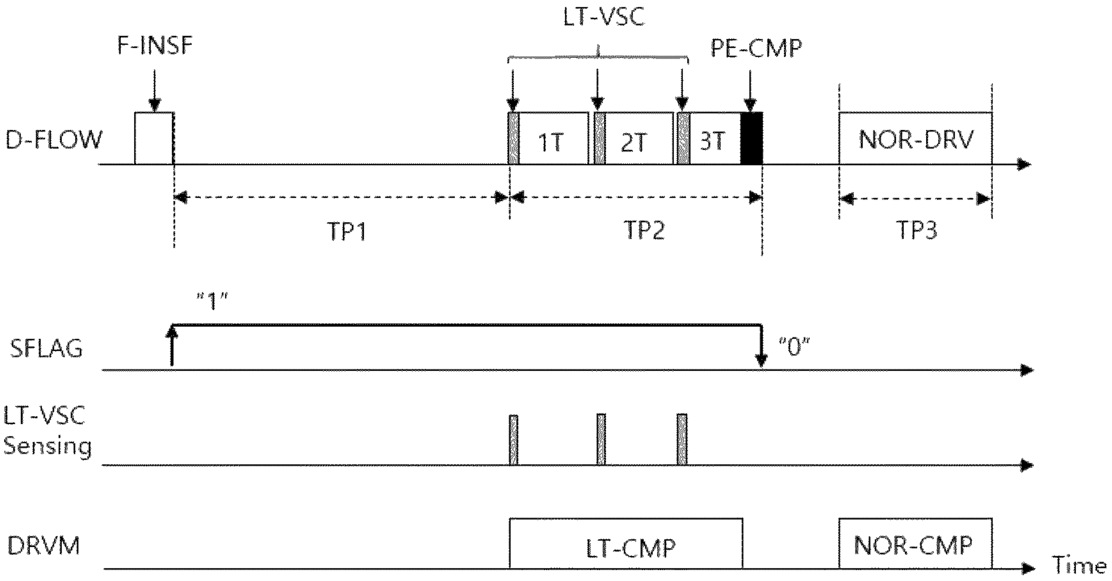
FIG. 19 is a concept diagram explaining whether or not the driving waiting compensation, variation of the sensing flag, and states according to different driving modes has been executed according to the third embodiment.

FIG. 17 is a concept diagram explaining a driving waiting compensation method according to a third embodiment. FIG. 18 is a concept diagram explaining whether or not driving waiting compensation according to the third embodiment has been executed and variation of a sensing flag. FIG. 19 is a concept diagram explaining whether or not the driving waiting compensation according to the third embodiment has been executed, variation of the sensing flag, and states according to different driving modes.

As shown in FIG. 17, in accordance with the third embodiment, a light emitting display device may operate in an order of driving preparation CONFIG, driving waiting compensation LT-VSC, start compensation PS-CMP, end compensation PE-CMP, and normal driving NOR-DRV. The third embodiment may be selected in the case in which a receipt inspection is performed for an extended period.

As can be seen from an operation flow D-FLOW shown in FIG. 18, a sensing flag SFLAG may be maintained for a first period TP1 and a second period TP2 as the manufacturer sets a basic state of the sensing flag SFLAG to high (1) after performing final inspection F-INSF for the light emitting display device. A third period TP3 corresponds to the normal driving NOR-DRV executed after the sensing flag SFLAG transitions to low (0).

In accordance with the third embodiment, the light emitting display device may be set such that the state of the sensing flag SFLAG transitions to low (0) only when the end compensation PE-CMP is finally executed, even if the driving waiting compensation LT-VSC is executed alone or together with the start compensation PS-CMP in the second period TP2. In other words, the start compensation PS-CMP in FIG. 17 can be omitted, i.e., the light emitting display device may operate in an order of driving preparation CONFIG, driving waiting compensation LT-VSC, end compensation PE-CMP, and normal driving NOR-DRV.

FIG. 18 is an illustrative diagram showing that the light emitting display device was turned on/off in a first time 1T, a second time 2T, and a third time 3T in the second period TP2, the driving waiting compensation LT-VSC was executed in the first time 1T, and the end compensation PE-CMP was executed in the third time 3T. Execution of the end compensation PE-CMP in the third time 3T may mean that the end compensation PE-CMP was not normally executed in the first time 1T and the second time 2T because the light emitting display device was forcibly turned off in the first time 1T and the second time 2T.

As shown in FIG. 19, the light emitting display device may perform the driving waiting compensation LT-VSC several times in the second period TP2. This is because the sensing flag SFLAG maintains high (1) unless the end compensation PE-CMP is executed.

FIG. 19 is similar to FIG. 18, but is an illustrative diagram showing that the sensing flag SFLAG may continuously maintain high (1) unless the end compensation PE-CMP is normally executed, and sensing for execution of the driving waiting compensation LT-VSC (LT-VSC Sensing) may also be executed every time the light emitting display device is turned on/off.

Referring to a driving mode DRVM shown in FIG. 19, a compensation method of the light emitting display device may be divided into a driving waiting compensation method LT-CMP and a normal driving compensation method NOR-CMP in accordance with a state of the sensing flag SFLAG. The compensation method performed in a period in which the sensing flag SFLAG maintains high (1) may be included in the driving waiting compensation method LT-CMP.

Accordingly, the start compensation PS-CMP of FIG. 17 and the end compensation PE-CMP of FIGS. 18 and 19 may be temporarily included in the driving waiting compensation method LT-CMP, together with the driving waiting compensation LT-VSC. Compensation executed in a remaining period in which the display panel is normally driven may be included in the normal driving compensation method NOR-CMP. For example, a method for sensing and compensating, in real time, mobility of driving transistors included in sub-pixels may be included in the normal driving compensation method NOR-CMP.

As apparent from the above description, the third embodiment may eliminate, within a relatively short time, a problem of luminance variation (screen stains or line or block-shaped stains) caused by distortion of threshold voltage information by necessarily performing compensation on a pixel basis based on a threshold voltage compensation value newly updated along with driving of the light emitting display device even when the light emitting display device is kept (or left) for a long time without being driven.

Figure 20:
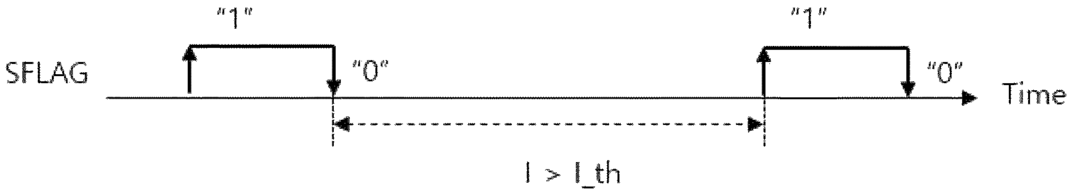
FIG. 20 is a concept diagram explaining variation of a sensing flag according to a fourth embodiment.
Figure 21:
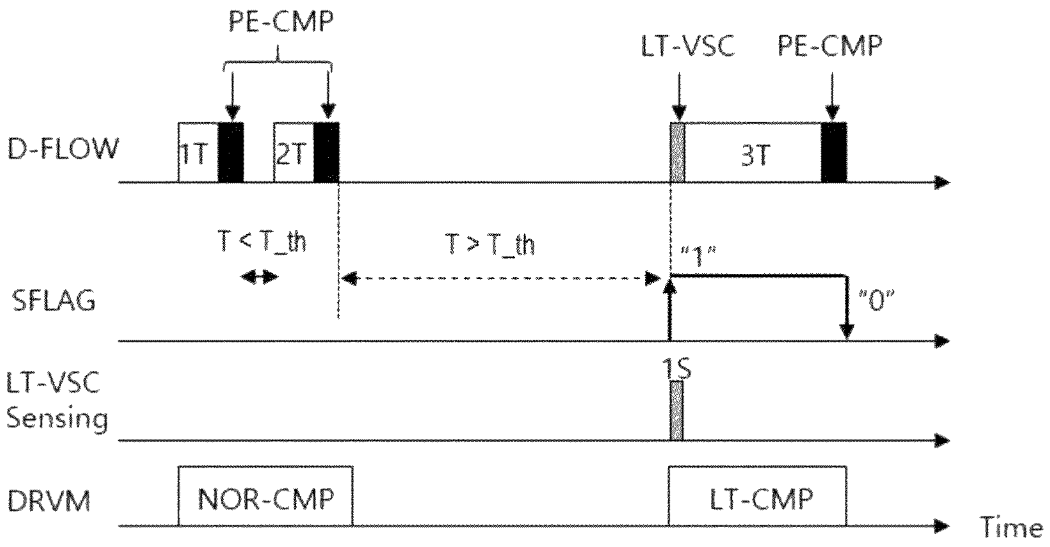
FIG. 21 is a concept diagram explaining whether or not driving waiting compensation, variation of the sensing flag, and states according to different driving modes has been executed according to the fourth embodiment.
Figure 22:
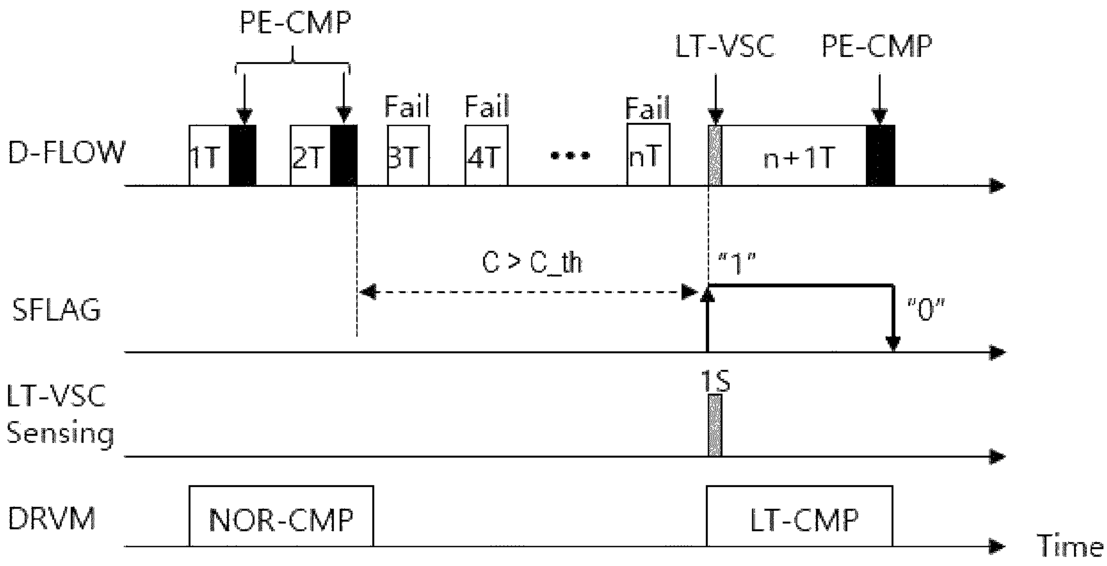
FIG. 22 is a concept diagram explaining a modification of the fourth embodiment.

FIG. 20 is a concept diagram explaining variation of a sensing flag according to a fourth embodiment. FIG. 21 is a concept diagram explaining whether or not the driving waiting compensation according to the fourth embodiment has been executed, variation of the sensing flag, and states according to different driving modes. FIG. 22 is a concept diagram explaining a modification of the fourth embodiment.

As shown in FIG. 20, in accordance with the fourth embodiment, when a sensing flag SFLAG deviates from an internally-set condition after transitioning from a state of high (1) to a state of low (0) (I>I_th), the sensing flag SFLAG may transition to the state of high (1) again. In this case, the sensing flag SFLAG may transition to the state of low (0) after execution of at least driving waiting compensation. This will be described hereinafter in conjunction with an example.

As can be seen from an operation flow D-FLOW shown in FIG. 21, the light emitting display device may have a period in which the light emitting display device is substantially not used, for example, a use waiting period, in addition to a delivery waiting period, a transportation period, and a receipt inspection period. The light emitting display device may generate the sensing flag SFLAG again in accordance with whether the light emitting display device deviates from a use waiting condition (in units of time of hours, days or days and hours). This will be described hereinafter.

When the light emitting display device operates before deviating from the use waiting condition (for example, in terms of time) (T<T_th), the light emitting display device may not generate the sensing flag SFLAG again. In this case, the light emitting display device may be in a state in which end compensation PE-CMP has been completed after being normally executed, as can be seen from a first time 1T and a second time 2T. For reference, the sensing flag SFLAG may be generated again by an image supplier 110 or a timing controller 120, as can be seen from FIG. 11.

On the other hand, when the light emitting display device does not operate after deviating from the use waiting condition (for example, in terms of time) (T>T_th), the light emitting display device may generate the sensing flag SFLAG again. In this case, the light emitting display device may transition the sensing flag SFLAG to low (0) after performing at least one of compensation methods included in the driving waiting compensation method LT-CMP, as can be seen from a third time 3T.

FIG. 21 shows an example in which the light emitting display device transitions the sensing flag SFLAG to low (0) after performing driving waiting compensation LT-VSC and end compensation PE-CMP included in the driving waiting compensation method LT-CMP. For reference, conditions for transitioning the sensing flag SFLAG to low (0) may be diversely selected, as described in the previous embodiments.

As can be seen from an operation flow D-FLOW shown in FIG. 22, the light emitting display device may have a period in which end compensation PE-CMP is not continuously executed, in addition to a delivery waiting period, a transportation period, a receipt inspection period, and a use waiting period. The light emitting display device may generate the sensing flag SFLAG again in accordance with whether or not the light emitting display device deviates from an end compensation execution condition internally set. This will be described hereinafter.

When the end compensation EP-CMP is normally executed, for example, in the first time T1 and the second time 2T, the light emitting display device may not generate the sensing flag SFLAG again. In this case, the light emitting display device may perform a normal driving compensation method NOR-CMP, except for the driving waiting compensation LT-VSC.

On the other hand, when the end compensation PE-CMP is not executed at internally-set times, for example, the third time 3T to an n-th time nT (C>C_th), (Fail) ("Fail" meaning non-execution of the end compensation), the light emitting display device may generate a sensing flag SFLAG of high (1) again. In this case, the light emitting display device may transition the sensing flag SFLAG to low (0) after performing at least one of the compensation methods included in the driving waiting compensation method LT-CMP, as can be seen from an n+1-th time n+1T.

FIG. 22 shows an example in which the light emitting display device transitions the sensing flag SFLAG to low (0) after performing, at the n+1-th time n+1T, driving waiting compensation LT-VSC and end compensation PE-CMP included in the driving waiting compensation method LT-CMP. For reference, conditions for transitioning the sensing flag SFLAG to low (0) may be diversely selected, as described in the previous embodiments.

As apparent from the above description, the fourth embodiment may enhance compensation reliability of the light emitting display device by forcibly performing the driving waiting compensation when a situation in which the light emitting display device is kept (or left) for a long time without being driven is repeated or when the end compensation is not appropriately executed.

FIGS. 23 to 26 are diagrams explaining reference matters in driving waiting compensation in accordance with the present disclosure. However, in the following description, only matters possibly taken into consideration in order to seek a solution capable of enhancing compensation accuracy while minimizing or removing sensing noise, errors, etc. in compensation of a threshold voltage of a driving transistor will be described.

Figure 23:
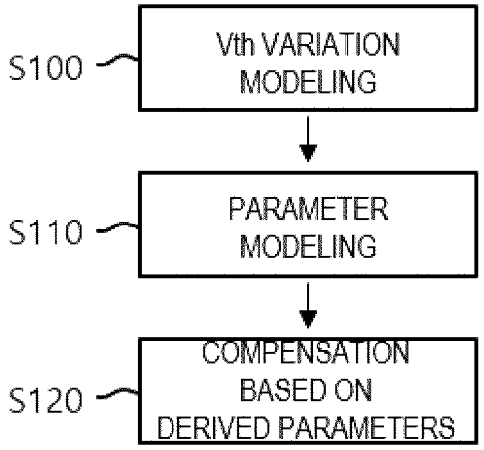
FIGS. 23 to 26 are diagrams explaining reference matters in driving waiting compensation in accordance with the present disclosure.

As shown in FIG. 23, threshold voltage (Vth) variation modeling S100, parameter modeling S110, compensation based on derived parameters S120, etc. may be taken into consideration for easier execution of driving waiting compensation according to the present disclosure.

The threshold voltage (Vth) variation modeling S100 is a step of modeling threshold voltage variations of color-based driving transistors of sub-pixels in a non-driving state (storage/transportation or the like) in which the light emitting display device is not driven. A threshold voltage (Vth) variation of each driving transistor may be modeled based on a linear function with a threshold voltage value of the driving transistor as a variable.

Figure 24:
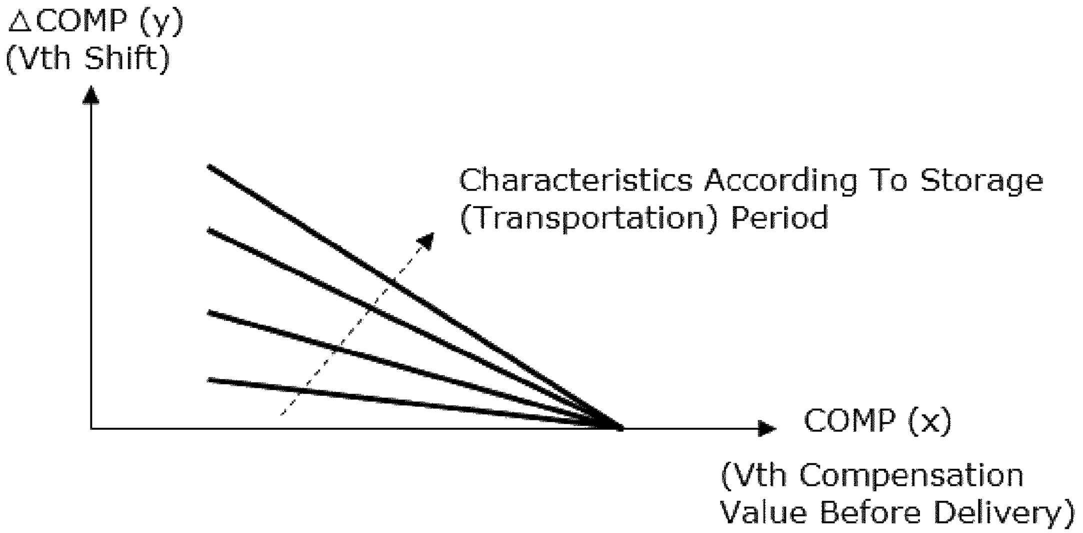
Figure 25:
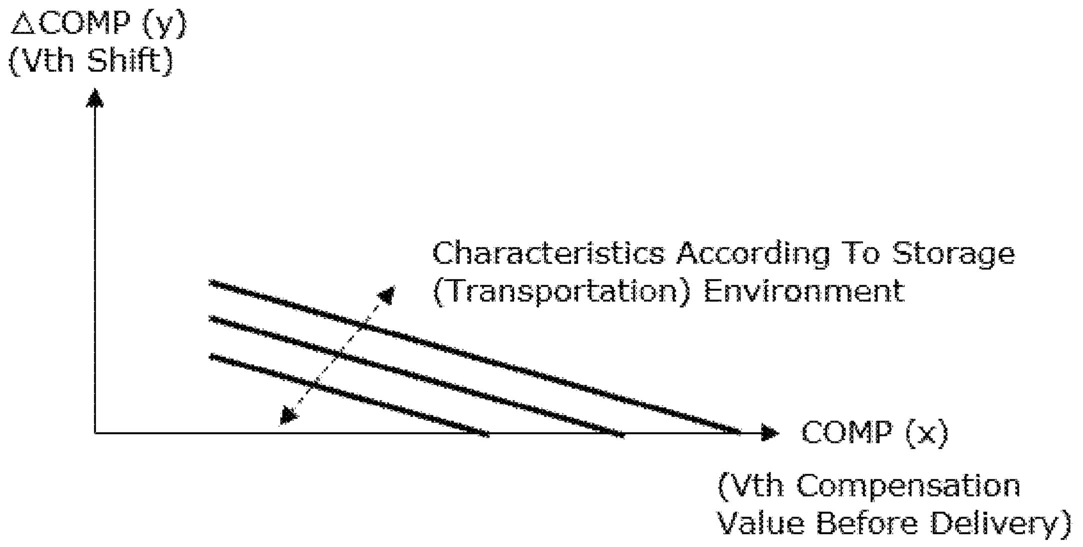

As shown in FIGS. 24 and 25, threshold voltage variations of the color-based driving transistors of the sub-pixels in the non-driving state in which the light emitting display device is not driven may be varied in accordance with temporal conditions, environmental conditions, etc. such as an increase in storage (transportation) period, variation of a storage (transportation) environment, or the like. Accordingly, upon modeling threshold voltage (Vth) variations, it is preferred that the above-described characteristics be referred to. In addition, the threshold voltage (Vth) variation modeling S100 may further include modeling checking for determining appropriateness, effectiveness, consistency, etc. of a modeled value.

Figure 26:
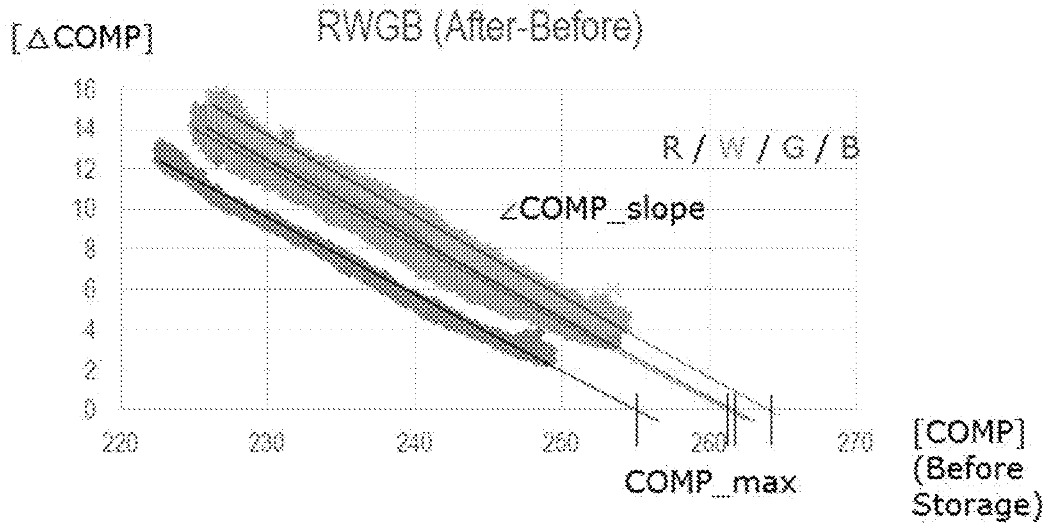

The parameter modeling S110 is a step of modeling a relation between before and after threshold voltage compensation values for a driving transistor based on at least two parameters. It may be possible to model a relation between a pre-storage threshold voltage compensation value COMP and a post-storage threshold voltage compensation value ΔCOMP of each of the color-based driving transistors of the sub-pixels R/W/G/B so far as there are two parameters, that is, an x-intercept COMP_max and a slope COMP_slope, in a graph modeled based on a linear function, as shown in FIG. 26. The pre-storage threshold voltage compensation value COMP may be a threshold voltage compensation value of each driving transistor given in final inspection (or in delivery) of the light emitting display device, and the post-storage threshold voltage compensation value ΔCOMP may be a threshold voltage compensation value varied in accordance with driving waiting of the light emitting display device.

Since the threshold voltage variation of each of the color-based driving transistors of the sub-pixels in a non-driving state (storage/transportation or the like) may be derived based on a linear function, the above-described modeling may be achieved so long as there are two pieces of pixel data capable of providing two parameters. Accordingly, it may be possible to model a relation between before and after threshold voltage values for each driving transistor only by sensing one gate line and obtaining two pieces of pixel data.

In addition, on one gate line, there are not only a sub-pixel configured to emit one color, but also sub-pixels configured to emit a plurality of colors. Accordingly, even when only one gate line is sensed, relations between before and after threshold voltage compensation values for driving transistors may be provided for different colors of the sub-pixels R/W/G/B, respectively.

In addition, FIG. 26 is a modeling graph depicted based on average vertical data (3,840 pieces of data obtained by averaging data of sub-pixels R/W/G/B each constituted by 2,160 pieces of data). When a modeling graph for compensation of a non-driving state (storage/transportation or the like) is configured using only a part of data, accuracy thereof may be lowered due to sensing noise, errors, etc. Accordingly, when the modeling graph is configured based on average data obtained by averaging a plurality of pieces of data obtained based on different colors of the sub-pixels R/W/G/B, it may be possible to minimize or remove noise or errors.

The compensation based on derived parameters S120 is a step of executing the above-described driving waiting compensation, and compensating threshold voltages of color-based driving transistors of the sub-pixels in a non-driving state (storage/transportation or the like) based on the parameters derived through the modeling graph.

As apparent from the above description, the present disclosure has an effect capable of eliminating a problem of luminance variation (screen stains or line or block-shaped stains) caused by distortion of threshold voltage information possibly occurring when the display device is kept (or left) for a long time without being driven. In addition, the present disclosure has an effect capable of enhancing compensation accuracy by performing compensation per pixel based on a threshold voltage compensation value newly updated along with driving of the light emitting display device even when the light emitting display device is kept (or left) for a long time without being driven. Furthermore, the present disclosure has an effect capable of enhancing compensation reliability of the light emitting display device by forcibly performing end compensation when a situation in which the light emitting display device is kept (or left) for a long time without being driven is repeated or when the end compensation is not appropriately executed.

Effects according to the exemplary embodiments of the disclosure are not limited to the above-illustrated contents, and more various effects may be included in the specification.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A display device comprising:

a display module comprising a display panel configured to display an image, a driver configured to drive the display panel, and a timing controller configured to control the driver and generate a sensing flag; and a power supply configured to supply power that drives the display module, wherein the display module operates in an order of a driving preparation configured to operate a basic configuration required for an operation of the display device, a driving waiting compensation configured to sense at least one gate line for compensation of a driving waiting state of the display panel, and a normal driving configured to display an image on the display panel, wherein the driving preparation occurs after power is applied to the display module and before the driving waiting compensation, wherein the sensing flag is in an active state during the driving waiting compensation, wherein the driving waiting compensation includes a process of sensing a threshold voltage of a driving transistor of a sub-pixel connected to the at least one gate line during which a voltage of a source node of the driving transistor rises over time, and wherein the driving waiting compensation further includes a process of updating, using the sensed threshold voltage, a compensation value for compensating a data voltage to be applied to the driving transistor during the normal driving.

2. The display device according to claim 1, wherein the display module performs the driving waiting compensation when the sensing flag defined in the timing controller is in the active state.

3. The display device according to claim 2, wherein the display module further performs driving preparation compensation between the driving waiting compensation and the normal driving and sensing all gate lines of the display panel.

4. The display device according to claim 2, wherein the sensing flag transitions to an inactive state after execution of the driving waiting compensation.

5. The display device according to claim 4, wherein the sensing flag maintains the inactive state during execution of the normal driving.

6. The display device according to claim 3, wherein the sensing flag transitions to an inactive state after execution of the driving waiting compensation and the driving preparation compensation.

7. The display device according to claim 2, wherein the sensing flag is generated again to have the active state when the display device deviates from a use waiting condition of the display panel.

8. The display device according to claim 2, wherein the sensing flag is generated again to have the active state when the display device deviates from an end compensation execution condition of the display panel.

9. The display device according to claim 1, wherein the display module further performs end compensation after the normal driving, to compensate for variation of characteristics caused by degradation when the normal driving has been executed.

10. The display device according to claim 3, wherein the driving preparation compensation comprises at least one of start compensation and end compensation.

* * * * *